(12) United States Patent
Ito

(10) Patent No.: US 6,385,521 B1
(45) Date of Patent: May 7, 2002

(54) VEHICLE VIBRATION RESTRAINING APPARATUS AND METHOD

(75) Inventor: Yasushi Ito, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/503,496

(22) Filed: Feb. 14, 2000

(30) Foreign Application Priority Data

Feb. 16, 1999 (JP) .............................. 11-037860

(51) Int. Cl.⁷ .............................. B60K 41/04; G06F 7/00
(52) U.S. Cl. .............................. 701/53; 701/51; 701/52; 477/34
(58) Field of Search .............................. 707/51, 52, 53; 477/41, 34

(56) References Cited

U.S. PATENT DOCUMENTS

| 4,720,793 A | * | 1/1988 | Watanabe et al. ......... 364/424.1 |
| 6,063,002 A | * | 5/2000 | Nobumoto et al. ........... 477/41 |

FOREIGN PATENT DOCUMENTS

| EP | 0 530 381 | 10/1992 |
| EP | 11-5460 | 1/1999 |
| EP | 11-20512 | 1/1999 |
| JP | 07293649 A | 11/1995 |
| JP | 08177997 A | 7/1996 |
| JP | 11005460 A | 1/1999 |

OTHER PUBLICATIONS

C.Y. Mo, A.J. Beaumont, and N. N. Powell Active Control of Driveability 1996, pp. 215–224 No month.

* cited by examiner

Primary Examiner—Yonel Beaulieu
(74) Attorney, Agent, or Firm—Oblon, Spivak, McClelland, Maier & Neustadt, P.C.

(57) ABSTRACT

In a vibration restraining apparatus for canceling out front-rear vibrations of a vehicle by controlling the torque of an engine and the speed change ratio of a continuously variable transmission (CVT) from a time point preceding the end of a speed shift by half the period of the vehicle front-rear vibrations, a specific vibration period of the vehicle in accordance with a vehicle-carried load is calculated based on changes in the revolution speed of the engine, and a timing of an control output to the engine or the CVT is determined based on the calculated specific vibration period. Even if the number of occupants or the vehicle-carried load changes, the value of the specific vibration period of the vehicle is corrected in accordance with such a change, so that vehicle vibrations can be properly restrained.

30 Claims, 8 Drawing Sheets

R:PRESENT CVT SPEED RATIO

Ri CVT SPEED RATIO AT GRID POINTS IN SPECIFIC PERIOD MAP $1 \leq i \leq if$

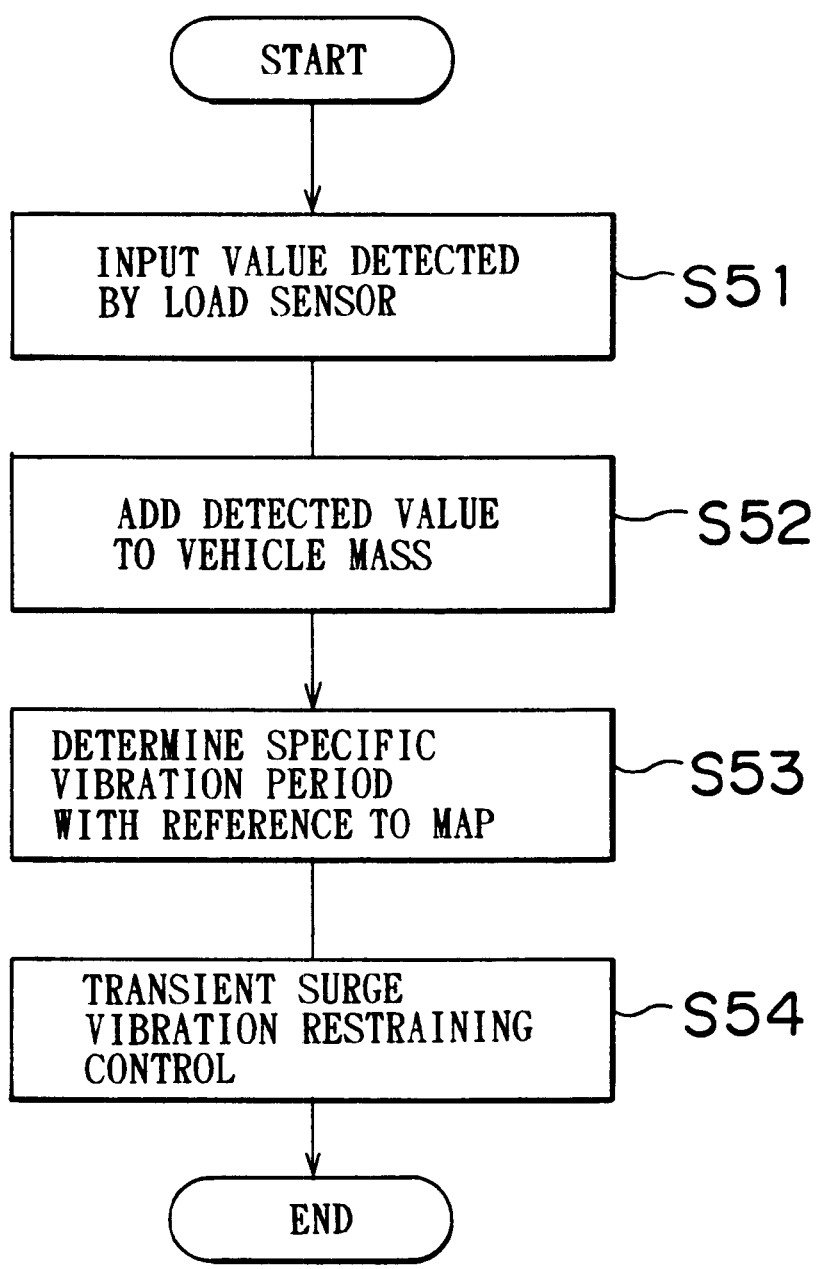

VEHICLE VIBRATION RESTRAINING APPARATUS AND METHOD

INCORPORATION BY REFERENCE

The disclosure of Japanese Patent Application No. HEI 11-37860 filed on Feb. 16, 1999 including the specification, drawings and abstract reference in its entirety.

BACKGROUND OF THE INVENTION

1. Field of the Invention

The present invention relates to a vehicle vibration restraining apparatus for restraining vibrations of a vehicle by controlling at least one of a power source of the vehicle and a continuously variable transmission provided between the power source and a vehicle-driving portion and, more particularly, to an apparatus that performs a control to restrain front-rear vibrations (bucking or transient surge vibrations) of a vehicle and a control method for restraining vehicle front-rear vibrations.

2. Description of the Related Art

It is known that if a continuously variable transmission installed in a vehicle is operated to a lower speed side upon an output increase request or an acceleration request, for example a depression of an accelerator pedal or the like, the vehicle body experiences front-rear vibration at the time of completion of the speed-reducing shift. Such vibration, generally termed bucking or transient surge vibration, is caused by an inertia torque, an oscillating elasticity of a power transmission system, and the like. More specifically, when the continuously variable transmission is operated to a lower speed side upon an acceleration request or an output increase request to the power source such as an engine or the like, the rotation speed of a rotating body involved in the power transmission changes, thereby producing an inertia torque in accordance with the amount of change in the rotation speed of the rotating body (angular acceleration) and the inertia moment. The inertia torque is released when the rotation speed of the rotating body stabilizes at a target speed, approximately at the end of the speed shift. As a result, the released inertia torque temporarily increases the driving torque, so that front-rear vibration occurs despite the oscillating elasticity of the power transmission system.

Japanese Patent Application Laid-Open No. HEI 8-177997 describes an apparatus for restraining the above-described front-rear vibration of a vehicle. This apparatus restrains vehicle front-rear vibration s by controlling the transmission speed change ratio. Specifically, the apparatus determines an end timing of a speed shift based on a target speed ratio and a present speed ratio. Furthermore, the apparatus estimates a half period of vehicle front-rear vibrations expected to occur at the end of the speed shift, on the basis of the input torque to the transmission and the actual speed ratio. At a time preceding the end point of the speed shift by the half period of the vehicle front-rear vibrations, the apparatus forcibly corrects the speed change ratio to the higher speed side. Due to this apparatus design, about half the inertia torque is released during the duration between the time point preceding the shift end point by the half period of the vibrations and the shift end point. After the shift end point, the remaining inertia torque is released in the form of vibrations whose phase is opposite to that of the vehicle front-rear vibrations, so that the inertia torque offsets vehicle front-rear vibrations. In this manner, the vehicle front-rear vibrations are restrained. This control will be hereinafter referred to as "transient surge vibration restraining control".

The apparatus described in Japanese Patent Application Laid-Open No. HEI 8-177997 performs the transient surge vibration restraining control at the time of a speed shift, although a slight oscillation remains in the power transmission system at that time. Therefore, vehicle front-rear vibrations may not be precisely restrained. To overcome this problem, an apparatus that effectively restrains vehicle front-rear vibrations by controlling both the output torque of a power source and the speed change ratio of a continuously variable transmission is proposed in, for example, Japanese Patent Application Laid-Open No. HEI 11-5460. This apparatus controls the output torque of the power source so that the drive wheel torque remains unchanged during the duration between the start of a speed shift of the continuously variable transmission and a time point preceding the end of the speed shift by half the period of the vehicle front-rear vibrations, and so the output torque reaches a target output torque at the aforementioned time point and remains at the target value thereafter, and controls the output speed of the continuously variable transmission so that the drive wheel torque remains at half a target torque from the time point preceding the end of the speed shift by half the vibration period until the end of the speed shift. The apparatus precludes oscillation of the power transmission system by optimally controlling both the output torque of the power source and the output speed of the continuously variable transmission as described above, so that vehicle front-rear vibrations can be effectively controlled.

However, the aforementioned conventional apparatuses use a specific value calculated from the speed change ratio of the continuously variable transmission and a preset total weight of a vehicle carrying an average load (i.e., the sum of the vehicle weight, an expected occupant weight, and an expected luggage weight), as a value of half the specific vibration period of the vehicle (vehicle front-rear vibration period) needed for the vibration restraining control. At specific times based on the calculated specific value, control signals and the like are outputted to the power source and the continuously variable transmission. Therefore, when the number of occupants or the vehicle-carried load changes, the control timing becomes imprecise, so that proper vibration control becomes impossible.

SUMMARY OF THE INVENTION

Accordingly, it is an object of the invention to provide a vibration restraining apparatus and a vibration restraining method capable of performing proper vibration control by sufficiently precluding vehicle front-rear vibrations even if the number of occupants or the vehicle-carried load changes.

To achieve the aforementioned and other objects, the invention provides a vehicle vibration restraining apparatus for restraining a front-rear vibration of a vehicle including a power source that produces a drive force of the vehicle, a continuously variable transmission that transmits the drive force to a vehicle-driving portion and that continuously varies a speed change ratio, a vibration restrainer that controls at least one of the power source and the continuously variable transmission so as to restrain the front-rear vibration of the vehicle, a vibration period calculator that calculates a specific vibration period of the vehicle in accordance with a state of load on the vehicle, and a timing determiner that determines a timing of a control output to the at least one of the power source and the continuously variable transmission based on the specific vibration period calculated by the vibration period calculator.

This vehicle vibration restraining apparatus calculates a specific vibration period of the vehicle in accordance with a state of load on the vehicle, and calculates a timing of a control output to the power source or the continuously variable transmission based on the calculated specific vibration period. Therefore, if the number of occupants in the vehicle or the load carried by the vehicle changes, the control output is produced at a proper time in accordance with such a change. Hence, even if the vehicle-carried load changes, the apparatus is able to properly restrain vehicle vibrations by sufficiently precluding vehicle front-rear vibrations.

In the vehicle vibration restraining apparatus, the vibration period calculator may calculate the specific vibration period of the vehicle based on either a duration between peaks of change in an output rotation speed of the power source, a duration between peaks of change in a speed of the vehicle, or a duration between peaks of change in an acceleration of the vehicle.

During front-rear vibrations of the vehicle, the vibrations appear as periodical fluctuations of the vehicle speed or acceleration. Furthermore, vehicle front-rear vibrations propagate from the vehicle-driving portion to the power source via the continuously variable transmission, so that the vibrations can also be detected as periodical fluctuations of the output rotational speed of the power source. Therefore, the vehicle vibration restraining apparatus is able to determine a duration between peaks of change in at least one of the output rotational speed of the power source, the vehicle speed, and the vehicle acceleration (i.e., a duration between a relative maximum and a relative minimum, or between a relative maximum and another relative maximum, or between a relative minimum and another relative minimum) and to determine an accurate specific vibration period of the vehicle based on the inter-peak duration.

Furthermore, in the vehicle vibration restraining apparatus of the invention, the vibration period calculator may calculate the specific vibration period of the vehicle by subjecting either an output rotation speed of the power source, a speed of the vehicle, or an acceleration of the vehicle to a fast Fourier transform.

That is, utilizing the fact that vehicle front-rear vibrations appear as periodical fluctuations of the vehicle speed, the vehicle acceleration or the output rotational speed of the power source, the vibration period calculator can subject data regarding such fluctuations to a fast Fourier transform to determine an accurate specific vibration period of the vehicle.

Further, in the vehicle vibration restraining apparatus, the vibration period calculator may calculate the specific vibration period of the vehicle based on both the drive force from the power source and an acceleration of the vehicle.

The specific vibration period of a vehicle has a correspondence to the total weight of the vehicle including the amount of load carried by the vehicle. The total weight of the loaded vehicle can be determined on the basis of a relationship between the drive force from the power source and the acceleration of the vehicle. Therefore, based on the total weight of the loaded vehicle calculated on the basis of the drive force from the power source and the vehicle acceleration, a specific vibration period of the vehicle can be accurately determined.

Still further, in the vehicle vibration restraining apparatus, the vibration period calculator may calculate the specific vibration period of the vehicle based on a value detected by a vehicle-carried load detector provided in the vehicle.

The specific vibration period of a vehicle has a correspondence to the total weight of the vehicle including the amount of load carried by the vehicle, as mentioned above. The total weight of the loaded vehicle can be determined as the sum of the mass of the vehicle, the amount of load (occupants and luggage) carried by the vehicle. Therefore, a specific vibration period of the vehicle can be accurately determined based on the detection value from the vehicle-carried load sensor.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein:

FIG. 7 is a flowchart illustrating a process of determining a specific vibration period of a vehicle in Embodiment 4.

DETAILED DESCRIPTION OF PREFERRED EMBODIMENTS

Figure 1:
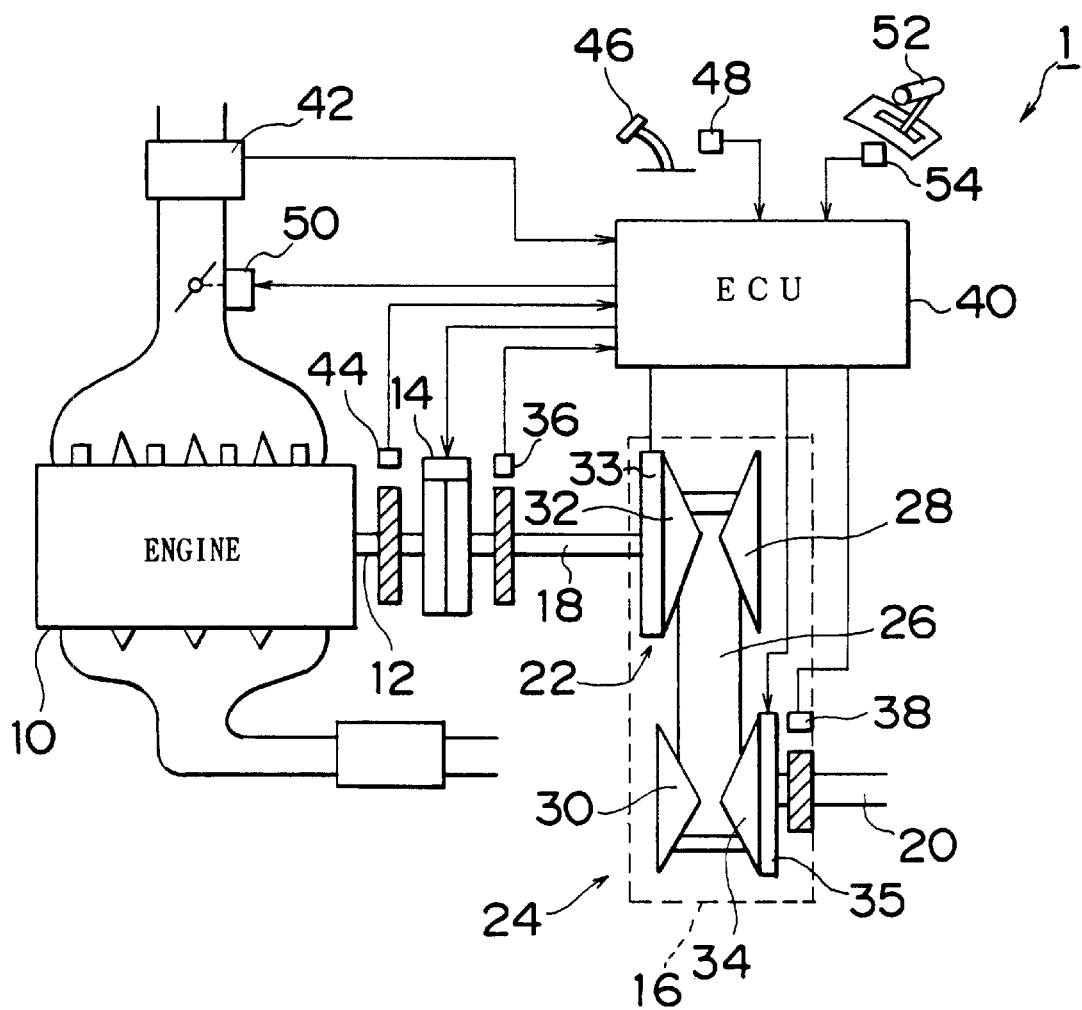
FIG. 1 is a schematic block diagram of a construction of a preferred embodiment of the vehicle vibration restraining apparatus of the invention.

Preferred embodiments of the invention will be described hereinafter with reference to the accompanying drawings. FIG. 1 is a schematic diagram of a construction of a vehicle vibration restraining apparatus 1 according to an embodiment of the invention. A vehicle to which the embodiment is applied has a continuously variable transmission 16 disposed between an engine 10, that is, a power source, and a vehicle-driving portion (not shown). The power source of the vehicle is not necessarily an internal combustion engine such as the engine 10, but may also be an electric motor, or a combination of an electric motor and an internal combustion engine, or the like.

Referring to FIG. 1, a crankshaft 12 of the engine 10 is connected to an input shaft 18 of a belt-type continuously variable transmission (hereinafter, simply referred to as "CVT") 16 via a takeoff clutch 14. An output shaft 20 of the CVT 16 is connected to a drive axle via a differential gear device (not shown) and the like, whereby torque is transmitted from the engine 10 to drive wheels provided in the vehicle-driving portion.

The input shaft 18 and the output shaft 20 of the CVT 16 are provided with variable pulleys 22 and 24, respectively, whose effective diameter is variable. The variable pulleys 22, 24 are interconnected by a transmission belt 26. Each of the variable pulleys 22, 24 includes a fixed rotating member 28, 30 fixed to the input shaft 18 or the output shaft 20, and a movable rotating member 32, 34 that is movable in the directions along the input shaft 18 or the output shaft 20 and immovable in rotating directions relative to the shaft.

The movable rotating members 32, 34 are connected to hydraulic actuators 33, 35, respectively. In accordance with operation of each hydraulic actuator 33, 35, the corresponding movable rotating member 32, 34 is moved in a direction along the input shaft 18 or the output shaft 20 so that the width of a V-shaped groove formed between the fixed rotating member 28, 30 and the movable rotating member 32, 34 changes, that is, the diameter of a portion the transmission belt 26 extending around the input shaft 18 or the output shaft 20 changes.

Rotation speed sensors 36, 38 are provided for detecting rotation speeds of the input shaft 18 and the output shaft 20, respectively. The rotation speed sensors 36, 38 are connected to an electronic control unit (hereinafter, simply referred to as "ECU") 40 made up mainly of a microcomputer. The ECU 40 calculates a speed change ratio of the CVT 16 based on detection signals from the rotation speed sensors 36, 38.

An air flow sensor 42 is provided in an intake pipe of the engine 10 to detect an intake air flow. A rotation speed sensor 44 is provided near the crankshaft 12 to detect the engine revolution speed. In accordance with the intake air flow detected by the air flow sensor 42 and the engine revolution speed detected by the rotation speed sensor 44, the ECU 40 optimally controls the amount of fuel injected and the ignition timing.

An accelerator pedal depression sensor 48 is provided near an accelerator pedal 46 to detect the degree of depression of the accelerator pedal 46. Based on the depression degree of the accelerator pedal 46 detected by the accelerator pedal depression sensor 48, the vehicle speed detected by the rotation speed sensor 38, and the engine revolution speed detected by the rotation speed sensor 44, the ECU 40 controls the intake air flow by using a throttle actuator 50, for example, in such a manner as to achieve an optimal fuel consumption.

A shift lever 52 disposed near a driver's seat is provided with a shift sensor 54 for detecting the position of the shift lever 52. Based on information detected by the shift sensor 54, for example, selection of the drive range or the like, and other information regarding, for example, vehicle speed, accelerator pedal depression degree and the like, the ECU 40 controls the takeoff clutch 14 and the speed change ratio of the CVT 16.

Although not shown in the drawings, a brake pedal sensor is provided near a brake pedal to detect the amount of operation of the brake pedal. Furthermore, a load sensor is provided at a coil spring seat of a shock absorber of the vehicle. The amount of operation of the brake pedal detected by the brake pedal sensor and the vehicle-carried load detected by the load sensor are inputted to the ECU 40.

Embodiment 1

A feature of Embodiment 1 is that a specific vibration period of the vehicle is calculated on the basis of changes in the revolution speed of the engine 10 and, in accordance with the calculated specific vibration speed, the timing of a control output to the CVT 16 is determined. In this control process, the specific vibration period of the vehicle is calculated by determining a duration between peaks of change in the revolution speed of the engine 10 if the engine revolution speed vibrationally changes in response to front-rear vibrations of the vehicle. The control process will be described with reference to the flowchart shown in FIG. 2A and FIG. 2B, on the assumption of a case where the vehicle accelerates upon a driver's action of depressing the accelerator pedal 46. The control process is performed by the ECU 40 operating the engine 10 and the CVT 16.

Figure 2A:
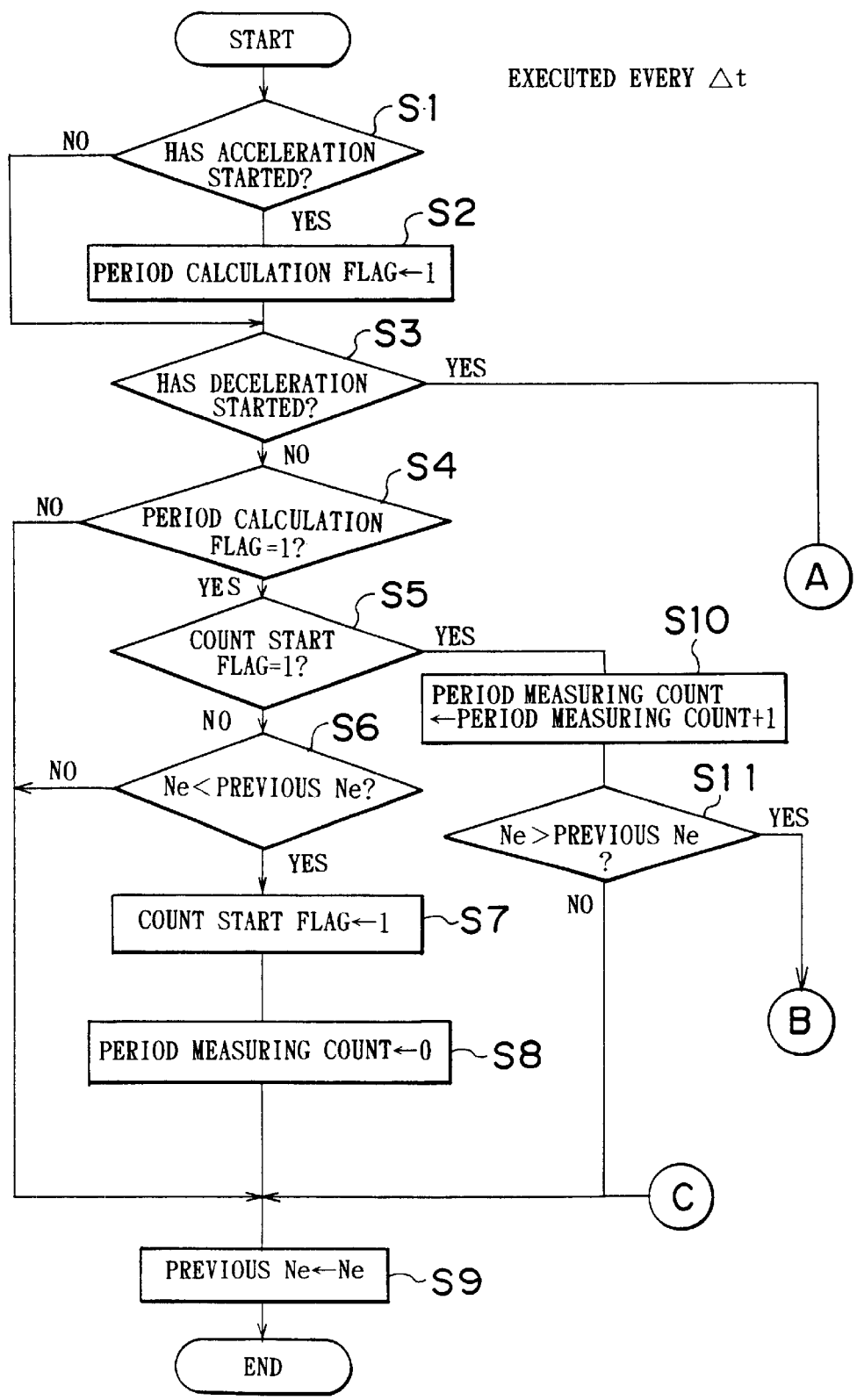
FIG. 2A is a flowchart illustrating one part of process of determining a specific vibration period of a vehicle and calculating a correction amount for the transient surge vibration restraining control in Embodiment 1 of the invention.

In step S1 in FIG. 2A, the ECU 40 determines whether acceleration of the vehicle has started on the basis of the depression degree of the acceleration pedal detected by the accelerator pedal depression sensor 48. Assuming that a driver presently depresses the accelerator pedal 46, it is determined in step S1 that vehicle acceleration has started (YES in step S1). Subsequently in step S2, the ECU 40 sets a period calculation flag for executing the calculation of a specific vibration period described below. In step S3, the ECU 40 makes negative determination since deceleration has not started. Subsequently in step S4, the ECU 40 determines whether the period calculation flag has been set. Since the period calculation flag has been set in step S2 in this case, the determination in step S4 is affirmative. Subsequently in step S5, the ECU 40 determines whether a count start flag has been set. Since the count start flag has not been set in this case, the determination in step S5 is negative.

Subsequently in step S6, the ECU 40 determines whether the revolution speed Ne of the engine 10 is lower than the previous value on the basis of the value detected by the rotation speed sensor 44. While the engine revolution speed Ne is increasing, the determination in step S6 is negative, and the control process proceeds to step S9, in which the engine revolution speed Ne is updated. The control process then returns to step S1.

When the engine revolution speed Ne has turned to a decrease, the determination in step S6 becomes affirmative. Subsequently, the ECU 40 sets the count start flag in step S7, and resets a period measuring counter in step S8. After the engine revolution speed Ne is updated in step S9, the control process returns to step S1.

In the next execution cycle, the ECU 40 makes a negative determination in step S1 and then in step S3, and makes affirmative determination in step S4. Subsequently in step S5, the ECU 40 determines whether the count start flag has been set. Since the count start flag was set in step S7 in the previous cycle, the determination in step S5 is affirmative, and the process proceeds to step S10. In step S1, "1" is added to the count of the period measuring counter. Subsequently in step S11, the ECU 40 determines whether the engine revolution speed Ne is higher than the previous value of the engine revolution speed Ne. The determination in step S1 is negative during a deceleration, that is, while the engine revolution speed Ne is decreasing. The process then proceeds to step S9, in which the engine revolution speed Ne is updated. In this manner, the control process repeatedly adds to the count of the period measuring counter in step S10 while the engine revolution speed Ne is decreasing although the accelerator pedal 46 has been depressed.

Operation performed when the engine revolution speed Ne has turned to an increase will next be described. At the end of a shift operation of the continuously variable transmission to a lower speed in response to an operation of depressing an accelerator pedal, that is, an accelerator (e.g., a throttle valve) opening operation, front-rear vibrations (transient surge vibrations) of the vehicle occur due to a sharp torque rise. FIG. 3 indicates changes in the engine revolution speed during transient surge vibrations. When the engine revolution speed Ne turns to an increase, that is, when the engine revolution speed Ne changes from a trough (relative minimum) toward a crest (relative maximum), the determination in step S11 becomes affirmative, and the control process proceeds to step S12 in FIG. 2B.

Figure 2B:
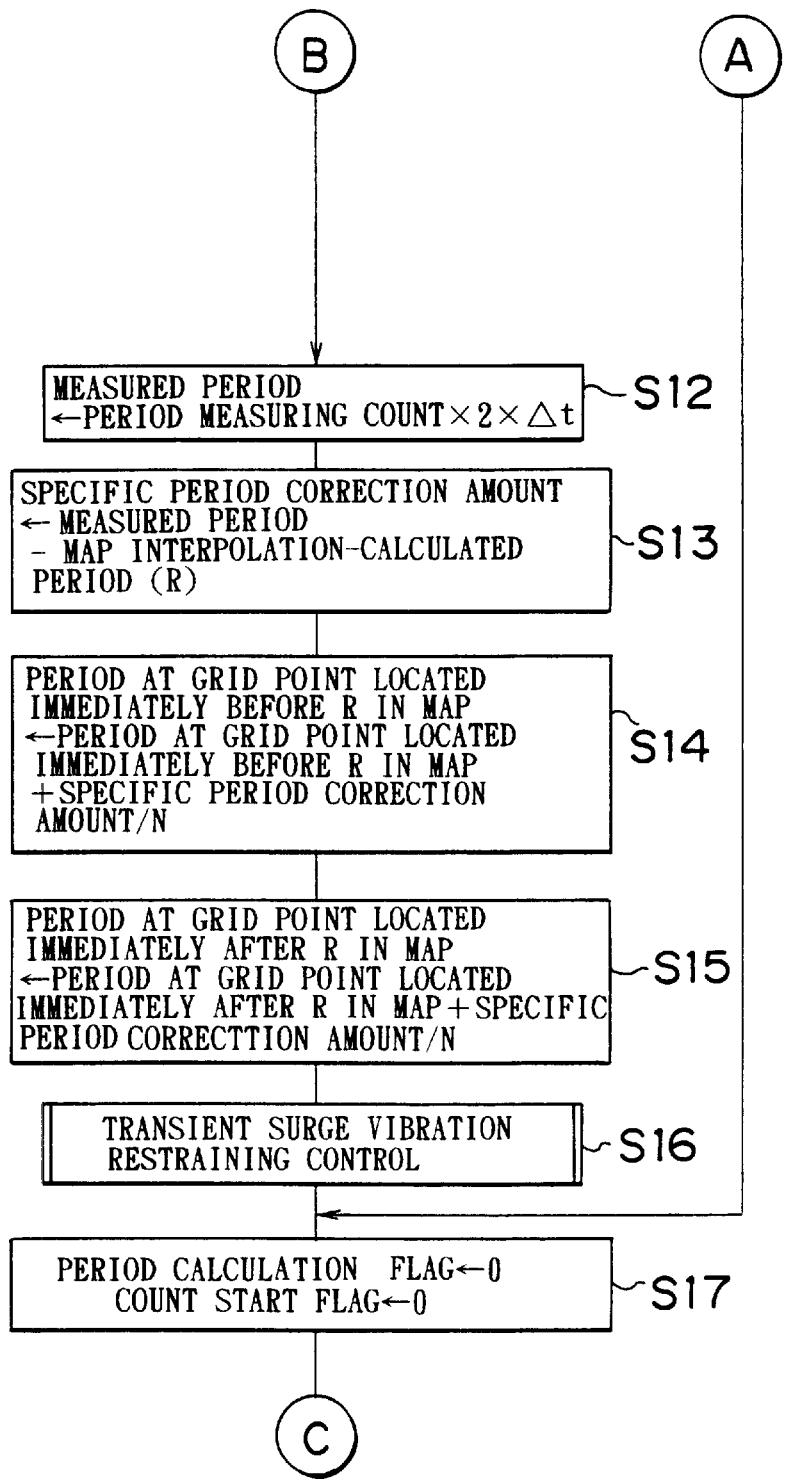
FIG. 2B is a flowchart illustrating another part of process of determining a specific vibration period of a vehicle and calculating a correction amount for the transient surge vibration restraining control in Embodiment 1 of the invention.
Figure 3:
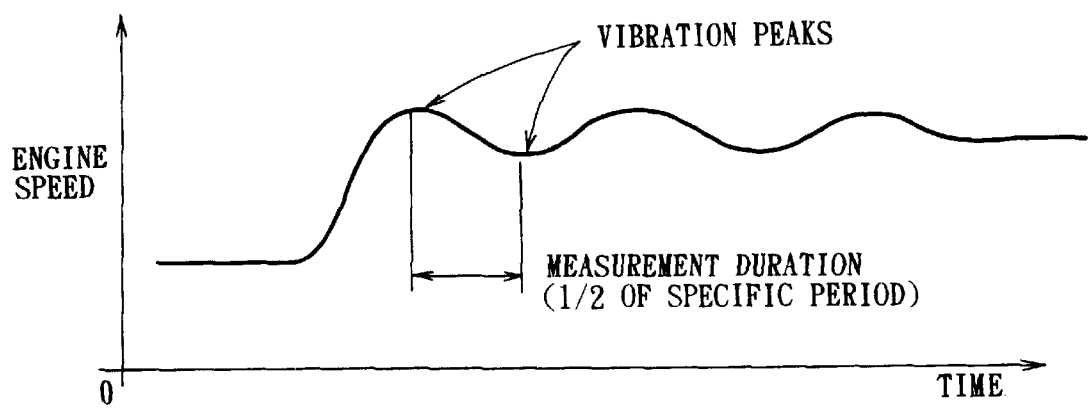
FIG. 3 is a graph indicating changes in the engine revolution speed during transient surge vibrations in Embodiment 1.

In step S12, the ECU 40 determines a measured period by multiplying the count of the period measuring counter by 2(t, that is, twice the execution period (t of the routine illustrated by the flowchart of FIG. 2A and FIG. 2B. This calculation corresponds to doubling the duration between two peaks of change in the engine revolution speed Ne, that is, the duration from a crest (relative maximum) to a trough (relative minimum), as indicated in FIG. 3. Therefore, the calculation for determining the measured period corresponds to a process of calculating a specific vibration period of the vehicle.

Subsequently in step 13, the ECU 40 subtracts from the measured period determined in step S12 a map interpolation-calculated period (R) selected from a map based on the present speed change ratio R of the CVT 16. Based on the subtraction result, the ECU 40 calculates an amount of correction needed for the specific vibration period of the vehicle pre-calculated from the speed change ratio R and a pre-set total weight of the vehicle with an average load (the sum of the weight of the vehicle, a weight of occupants, and a weight of luggage carried by the vehicle).

Subsequently in step S14, the ECU 40 adds an Nth (e.g., a quarter) of the value calculated in step S13 to the vibration period value existing at a grid point located immediately before the speed change ratio R of the CVT 16 in a vibration period map based on the speed change ratio R. The resultant value is substituted for the value of the vibration period existing at the grid point located immediately before the speed change ratio R of the CVT 16 in the vibration period map based on the speed change ratio R of the CVT 16, thereby updating the vibration period value. Subsequently in step S15, the ECU 40 adds an Nth (e.g., a quarter) of the value calculated in step S13 to the vibration period value existing at a grid point located immediately after the speed change ratio R of the CVT 16-in the vibration period map based on the speed change ratio R. The resultant value is substituted for the value of the vibration period existing at the grid point located immediately after the speed change ratio R of the CVT 16 in the vibration period map, thereby updating the vibration period value.

The calculating processes in steps S14 and S15 correspond to a process of correcting the specific vibration period value (previous value or default value) in a vibration period map on the basis of the actual specific vibration period determined in step S12. For the purpose of careful control considering a detection error, in particular, the correction is not performed at one time by using the entire correction value, but is performed dividedly by using an Nth (e.g., a quarter) of the correction value at a time.

Subsequently in step S16, the vibration period values updated in steps S14 and S15 are used as a value of the specific vibration period of the vehicle in accordance with the speed change ratio R, in the transient surge vibration restraining control of the engine 10 and the CVT 16 performed on the basis of a basic target torque based on the depression degree of the accelerator pedal and the engine revolution speed Ne. More specifically, based on the vibration period values updated in steps S14 and S15, the ECU 40 estimates a time point that precedes the end of a speed shift of the CVT 16 by half the period of frontrear vibrations of the vehicle. Furthermore, the ECU 40 controls the output torque of the engine 10 so that the drive wheel torque remains unchanged during the duration from the start of the speed shift of the CVT 16 to the time point preceding the end of the speed shift by half the period, and so that the output torque reaches a target output torque at the aforementioned time point and remains at the target value thereafter, and controls the output speed of the CVT 16 so that the drive wheel torque remains at half a target torque from that time point until the end of the speed shift.

Finally in step S17, the ECU 40 withdraws the period calculation flag and the count start flag. The control cycle then ends. In the control illustrated by the flowchart of FIG. 2A and FIG. 2B, if it is determined in step S3 that deceleration has been started on the basis of the value detected by the accelerator pedal depression sensor 48, the process jumps to step S17, in which the period calculation flag and the count start flag are withdrawn. Therefore, during the deceleration, the process of calculating and updating the specific vibration period in steps S12 through S15 is not performed.

As is understood from the above description, the ECU 40 in Embodiment 1 calculates a specific vibration period of the vehicle in step S12, by utilizing the fact that front-rear vibrations of the vehicle propagate from the vehicle-driving portion to the engine 10 via the CVT 16 and therefore can be detected as a periodical fluctuation of the revolution speed Ne of the engine 10. Based on the calculated specific vibration period, the ECU 40 determines the timing of a control output to the CVT 16. Therefore, if the number of occupants in the vehicle or the amount of load carried by the vehicle changes, the timing of the control output is changed in accordance with the change in the vehicle-carried load and the like, so that vehicle vibrations can be properly restrained by sufficiently precluding front-rear vibrations of the vehicle.

Although in Embodiment 1, an inter-peak duration from a crest (relative maximum) to a trough (relative minimum) of change in the engine revolution speed Ne is determined and used to calculate a specific vibration period, this construction may be replaced by a construction in which an inter-peak duration from a crest (relative maximum) to another crest (relative maximum), or from a trough (relative minimum) to a crest (relative maximum), or from a trough (relative minimum) to another trough (relative minimum), is determined and used to calculate a specific vibration period. Such alternative constructions achieve substantially the same advantages.

Although in Embodiment 1, the specific vibration period of the vehicle is calculated on the basis of a fluctuation of the revolution speed Ne of the engine 10, which is a power source, this construction may be replaced by a construction in which the specific vibration period of the vehicle is calculated by determining a duration between peaks of change in the vehicle speed detected by the rotation speed sensor 38 or the acceleration of the vehicle, which is an amount of change of the vehicle speed. Such alternative constructions achieve substantially the same advantages.

Embodiment 2

Figure 4:
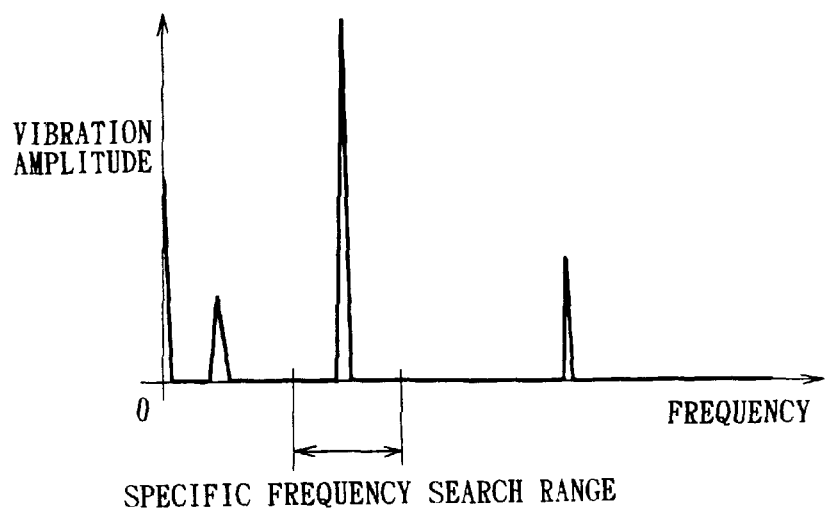
FIG. 4 is a graph indicating a frequency distribution of vibrations when the engine revolution speed is subjected to a fast Fourier transform in Embodiment 2.
Figure 5:
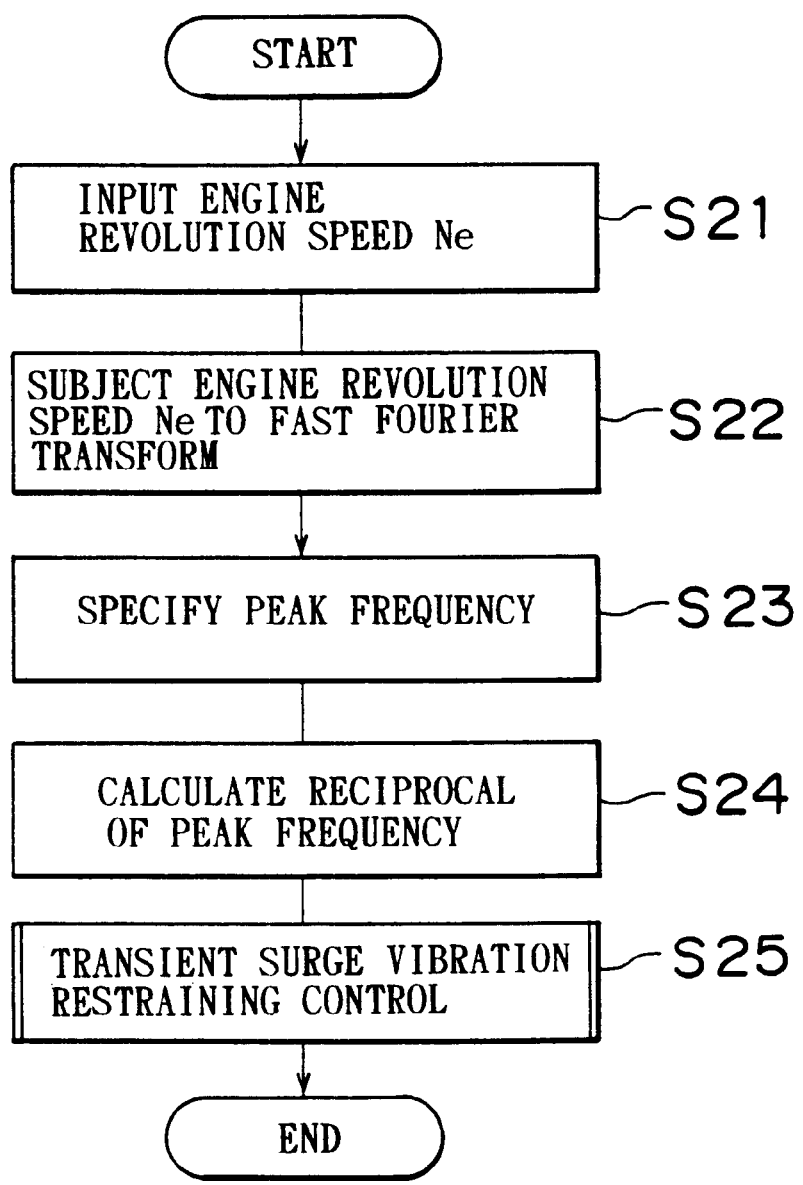
FIG. 5 is a flowchart illustrating a process of determining a specific vibration period of a vehicle in Embodiment 2.

A feature of Embodiment 2 is that a value of the engine revolution speed Ne is subjected to a fast Fourier transform. More specifically, in step S21 in the flowchart shown in FIG. 5, the ECU 40 inputs the engine revolution speed Ne detected by the rotation speed sensor 44. Subsequently in step S22, the ECU 40 subjects the engine revolution speed Ne to a fast Fourier transform to provide a frequency distribution as indicated in FIG. 4. In step S23, the ECU 40 specifies a peak frequency within a search frequency range that has a high probability of containing the specific vibration frequency of the vehicle. Subsequently in step S24, the ECU 40 calculates the reciprocal of the specified peak frequency to determine a specific vibration period. In this manner, the specific vibration period of the vehicle is determined from the engine revolution speed Ne detected by the rotation speed sensor 44.

The thus-determined specific vibration period of the vehicle is used in the process of correcting the vibration period value calculated by using the vibration period map based on the speed change ratio R of the CVT 16, on the basis of the specific vibration period, as in the process in steps S13 through S15 in Embodiment 1. As in steps S13 through S15, the correction is not performed in one operation but is performed dividedly by using an Nth (e.g., a quarter) of the correction amount at a time, for the purpose of careful control considering a calculation error. Subsequently in step S25, the newly obtained vibration period value is used as the value of the specific vibration period of the vehicle in the transient surge vibration restraining control of the engine 10 and the CVT 16 performed on the basis of the basic target torque based on the depression degree of the accelerator pedal and the engine revolution speed Ne.

Utilizing the fact that front-rear vibrations of the vehicle appear as periodical fluctuations of the output revolution speed of the engine 10, that is, a power source, Embodiment 2 subjects the engine revolution speed to a fast Fourier transform. Therefore, Embodiment 2 is able to determine an accurate specific vibration period of the vehicle.

In the control of Embodiment 2, a specific vibration period of the vehicle can be quickly and accurately determined by using a Fourier transform-dedicated processing device (FFT) that is provided in a portion of the ECU 40.

Front-rear vibrations of a vehicle can be detected as periodical fluctuations of the vehicle speed or acceleration. Therefore, the construction of Embodiment 2 in which a specific vibration period of the vehicle is determined from the engine revolution speed Ne may be replaced by a construction in which a specific vibration period of the vehicle is determined by subjecting the vehicle speed detected by the rotation speed sensor 38 or the vehicle acceleration, which is an amount of change of the vehicle speed, to a fast Fourier transform. Adoption of such a construction also achieves substantially the same advantages as those achieved by Embodiment 2.

Embodiment 3

A feature of Embodiment 3 is that a specific vibration period of a vehicle is calculated on the basis of values of the drive force produced by the engine 10, that is, a power source, and the vehicle acceleration. The specific vibration period of a vehicle corresponds to the total weight of the vehicle carrying a load. The total weight of the vehicle with a load can be determined on the basis of a relationship between the drive force produced by the power source and the vehicle acceleration. The drive force and the vehicle acceleration have the following relationship:

$$F - M \times g \times \sin \theta = M \times \alpha \quad [<q]r$$

where F is the drive force; $\alpha$ is the vehicle acceleration; M is the vehicle mass, g is the gravitational acceleration; and $\theta$ is a road slope.

The relational expression is applied to two different conditions occurring within a short duration. Since the duration is short, the road slope $\theta$ can be assumed to remain unchanged, so that the following equations are given:

$$F1 - M \times g \times \sin \theta = M \times \alpha 1 \quad (2)$$

$$F2 - M \times g \times \sin \theta = M \times \alpha 2 \quad (3)$$

The terms of $\theta$ are canceled out by subtracting the left side and the right side of equation (3) from those of equation (2). As a result, the following equation can be given:

$$M = (F1 - F2)/(\alpha 1 - \alpha 2) \quad (4)$$

Therefore, while the factor of road slope $\theta$ is ignored, the vehicle mass M can be determined, so that a specific vibration period of the vehicle can be determined. Utilizing this characteristic, Embodiment 3 determines an accurate specific vibration period of the vehicle based on the drive force from the power source and the acceleration of the vehicle. A process of determining a specific vibration period of the vehicle in Embodiment 3 will be described below with reference to the flowchart of FIG. 6A and FIG. 6B.

Figure 6A:
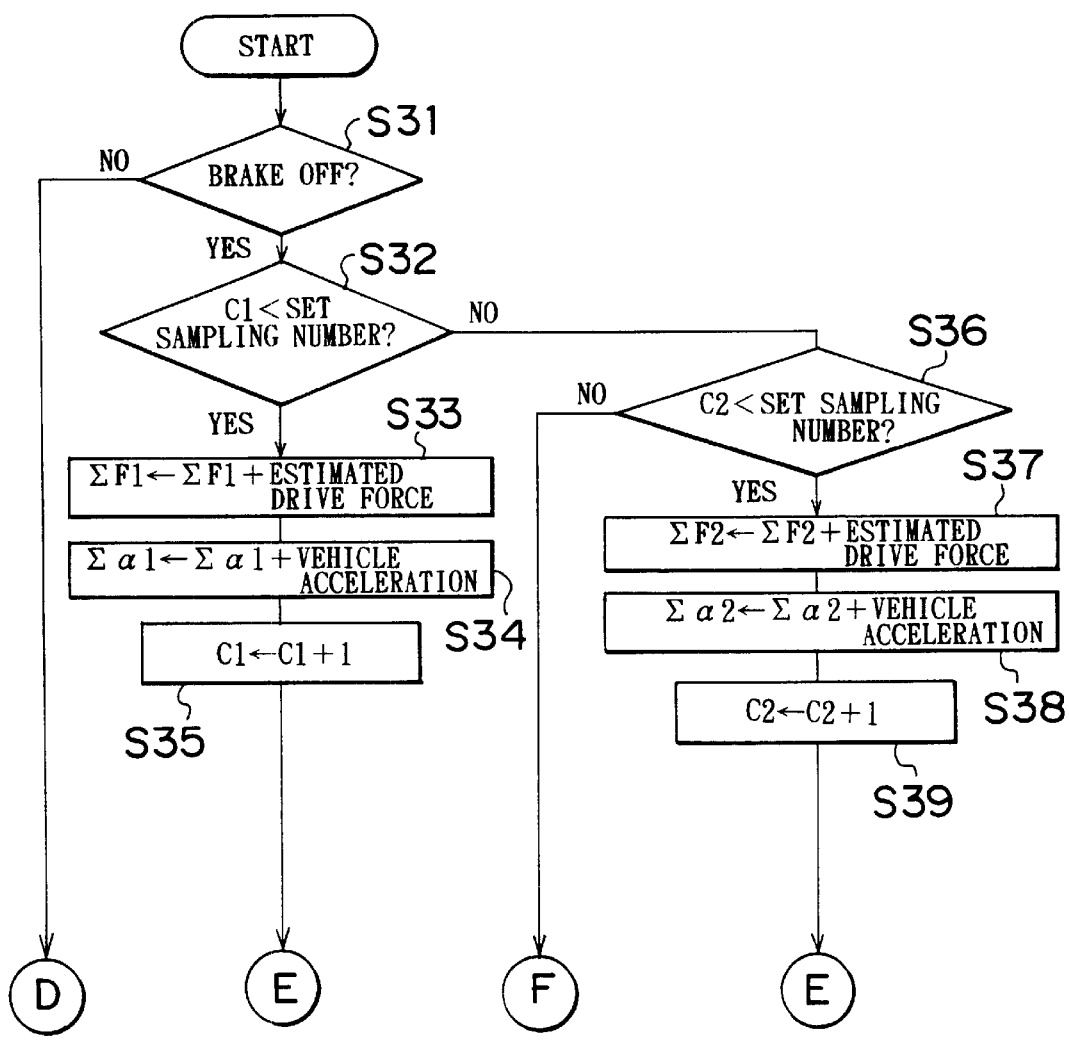
FIG. 6A is a flowchart illustrating one part of process of determining a specific vibration period of a vehicle and calculating an amount of correction for the transient surge vibration restraining control in Embodiment 3.

In step S31, the ECU 40 determines whether the brake is off on the basis of the value detected by a brake pedal sensor provided near the brake pedal. If the determination in step S31 in FIG. 6A is affirmative, the process proceeds to step S32, in which the ECU 40 determines whether the count of a counter is less than a set sampling number. If the determination in step S32 is affirmative, the ECU 40 adds an estimated value F1 of torque of the engine 10 in step S33, and adds a vehicle acceleration value $\alpha 1$ in step S34, and adds the count C1 in step S35. The process of steps S33, S34 and S35 is repeatedly performed until the count C1 exceeds the predetermined set sampling number (for example, 10).

When the count value C1 exceeds the predetermined set sampling number (e.g., ten times of sampling at every 500 ms), the process proceeds to step S36, in which it is determined whether a count C2 of the counter is less than a set sampling number. If the determination in step S36 is affirmative, the ECU 40 adds an estimated value F2 of torque of the engine 10 in step S37, and adds a vehicle acceleration value $\alpha 2$ in step S38, and adds the count C2 of the counter in step S39. The process of steps S37, S38 and S39 is repeatedly performed until the count C2 of the counter exceeds the predetermined set sampling number (for example, 20).

Figure 6B:
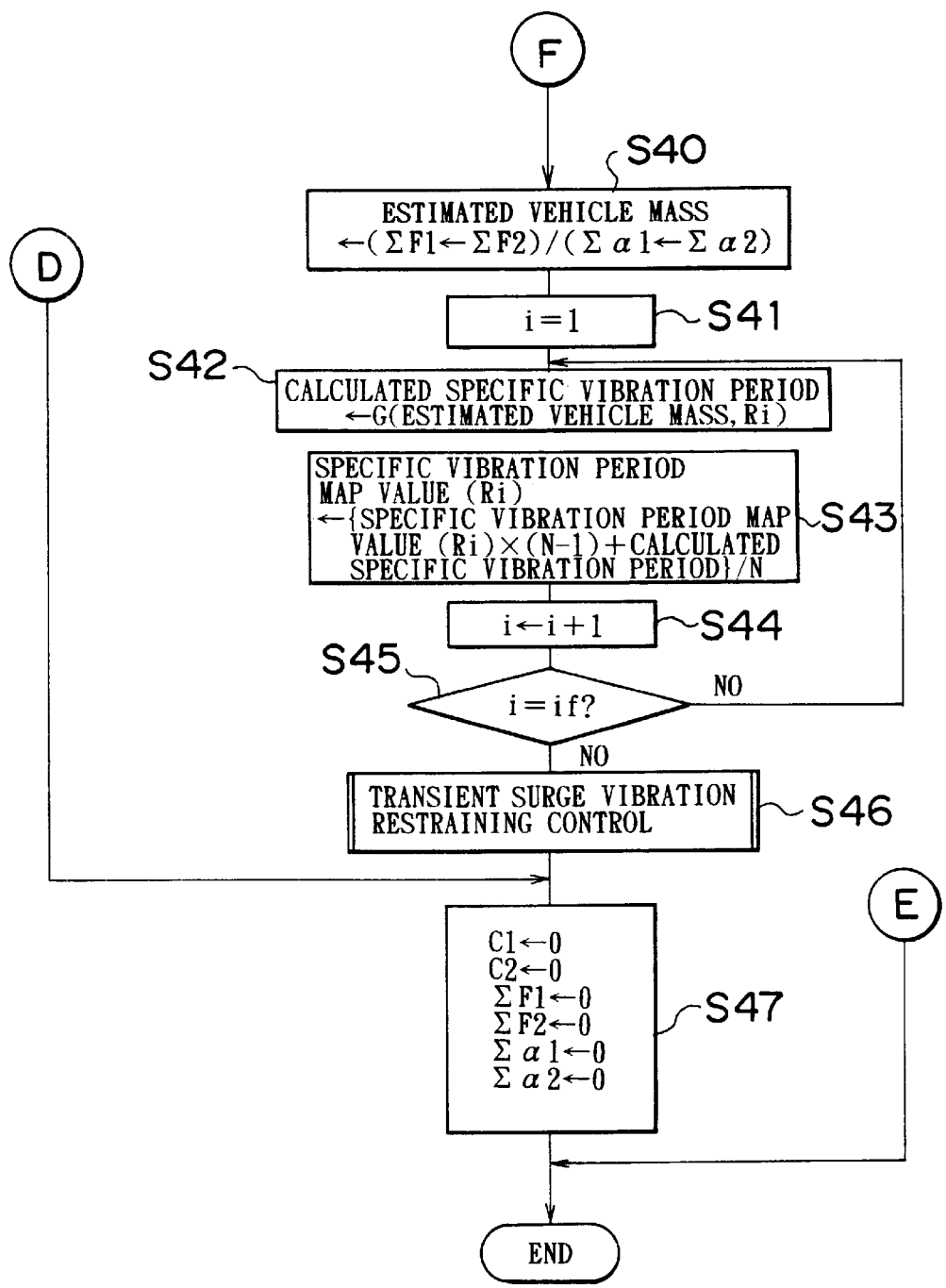
FIG. 6B is a flowchart illustrating another part of process of determining a specific vibration period of a vehicle and calculating a correction amount for the transient surge vibration restraining control in Embodiment 3.

When the count C2 of the counter exceeds the predetermined set sampling number (e.g., 20 times of sampling), the control process proceeds to step S40 in FIG. 6B, in which the ECU 40 determines an estimated vehicle mass M based on the estimated torque values F1, F2, the vehicle acceleration values $\alpha 1$, $\alpha 2$, and their accumulated values $\Sigma F1$, $\Sigma F2$, $\Sigma \alpha 1$, $\Sigma \alpha 2$, as in the following expression:

$$M = (\Sigma F1 - \Sigma F2)/(\Sigma \alpha 1 - \Sigma \alpha 2) \quad (5)$$

Expression (5) provides a vehicle mass M while ignoring the factor of road slope $\theta$ as in expression (4). The purpose of using the accumulated values is to increase the calculation precision. After this calculation, the ECU 40 substitutes "1" for the count i of the counter in step S41. The count i of the counter corresponds to each grid point in a map in which values of specific vibration period are predetermined corresponding to speed change ratios of the CVT 16. The grid points are defined in the ascending order from i to if (i - final), that is, a final value.

Based on the estimated vehicle mass determined in step S40, the ECU 40 determines a specific vibration period of the vehicle in accordance with a function G in step S42.

(calculated specific vibration period)=G(estimated vehicle mass, Ri)     (6)

where Ri is a speed change ratio of the CVT 16 as a grid point in a map in which values of specific vibration period are predetermined corresponding to speed change ratios of the CVT 16.

Subsequently in step S43, the ECU 40 determines a new specific vibration period map value from the calculated specific vibration period determined in step S42 and the predetermined specific vibration period map value as in equation (7):

$$\{(\text{specific vibration period map value})((N-1)+\text{calculated specific vibration period}\}/N \qquad (7)$$

This calculation corresponds to a process of correcting the specific vibration period value at each grid point, with a degree of effect of 1/N, in the map in which values of specific vibration period are predetermined corresponding to speed change ratios of the CVT 16. The calculation and the correction of a specific vibration period value in steps S42 and S43 are performed with respect to each grid point from i to if (steps S44, S45). In this manner, the specific vibration period is corrected with respect to each of the grid points from i to if.

In step S46, the thus-corrected specific vibration period value is used as the value of specific vibration period of the vehicle in the transient surge vibration restraining control of the engine 10 and the CVT 16 performed on the basis of a basic target torque based on the accelerator pedal depression degree and the engine revolution speed Ne, as in Embodiment 1.

After correction of values of specific vibration period is completed up to the grid point if, the control process proceeds to step S47, in which all of the counts C1, C2, the accumulated values of estimated drive force values $\Sigma F1$, $\Sigma F2$, and the accumulated values of vehicle acceleration values $\Sigma\alpha 1$, $\Sigma\alpha 2$ are reset. The control process then ends.

As is understood from the above description, Embodiment 3 is able to calculate a specific vibration period of the vehicle based on the drive force produced by the engine 10, that is, a power source, and the vehicle acceleration. Furthermore, Embodiment 3 is able to determine a vehicle mass M while ignoring the factor of road slope $\theta$, thereby advantageously achieving very accurate calculation.

Embodiment 4

A feature of Embodiment 4 is that a specific vibration period of a vehicle is calculated on the basis of a value detected by a load sensor provided in the vehicle. The specific vibration period of a vehicle and the total weight of the vehicle with a load have a correspondence to each other, as mentioned above. The total weight of the vehicle with a load is determined as the sum of the mass of the vehicle and a vehicle-carried load (including occupants and luggage). In Embodiment 4, therefore, it is possible to determine an accurate specific vibration period of the vehicle based on a value detected by the load sensor.

In step S51 in the flowchart of FIG. 7, the ECU 40 inputs a value detected by a load sensor provided on a coil spring seat of a shock absorber. Subsequently in step S52, the ECU 40 adds the input detection value from the load sensor to a pre-stored value of vehicle weight excluding a vehicle-carried load (i.e., vehicle mass). Subsequently in step S53, the ECU 40 selects a specific vibration period by referring to a predetermined vehicle-carried load-specific vibration period map. In this manner, a specific vibration period of the vehicle can be determined from a value detected by the load sensor.

The thus-determined specific vibration period of the vehicle is used in a process of correcting the calculated vibration periods determined by using a vibration period map based on speed change ratios of the CVT 16, on the basis of the specific vibration period, as in the process of steps S13 through S15 in Embodiment 1. As in steps S13 through S15, the process is not performed in a single step but is performed dividedly by using an Nth (e.g., a quarter) of the correction amount at a time, for the purpose of careful control considering a calculation error. In step S54, the newly adopted vibration period value is used as a value of the specific vibration period of the vehicle in the transient surge vibration restraining control of the engine 10 and the CVT 16 performed on the basis of a basic target torque based on the accelerator pedal depression degree and the engine revolution speed Ne, as in Embodiment 1.

Utilizing facts that the specific vibration period of a vehicle and the total weight of the vehicle with a load have correspond to each other and that the total weight of the loaded vehicle is determined as the sum of the mass of the vehicle and the vehicle-carried load (including occupants and luggage), this embodiment is able to determine an accurate specific vibration period of the vehicle.

Although Embodiment 4 has a construction in which a value detected by the load sensor provided on a coil spring seat of a shock absorber is used to determine a specific vibration period of the vehicle, this construction may be replaced by a construction in which a value detected by a shock absorber displacement sensor provided for detecting a displacement of the shock absorber is used-to determine a specific vibration period of the vehicle. Such a construction achieves an advantage that an existing sensor used for a control of the suspension system can also be used for the vibration control. The specific vibration period of a vehicle may also be determined by using a total weight of occupants obtained by multiplying the number of occupants detected by seat sensors provided in individual seats disposed in a passenger compartment or seat belt sensors provided in individual seat belt winder portions by a predetermined average occupant weight (e.g., 65 kg), and also using a value detected by a luggage weight sensor provided in a luggage compartment or the like. Such a construction makes it possible to determine a specific vibration period with a certain precision by using a simple device.

Although in the foregoing embodiments, a specific vibration period of the vehicle is determined by using a vehicle-carried load or a detected number of occupants, it is also possible to determine a specific vibration period of the vehicle taking into consideration a distribution of load or a height of the center of gravity of the vehicle detected by using a plural sets of sensors. Such a construction is also included in the scope of the invention.

While the present invention has been described with reference to what are presently considered to be preferred embodiments thereof, it is to be understood that the present invention is not limited to the disclosed embodiments or constructions. On the contrary, the present invention is intended to cover various modifications and equivalent arrangements.

What is claimed is:

1. A vehicle vibration restraining apparatus for restraining a front-rear vibration of a vehicle comprising a power source that produces a drive force of the vehicle and a continuously variable transmission that transmits the drive force to a vehicle-driving portion and that continuously varies a speed change ratio, the vehicle vibration restraining apparatus comprising:

a vibration restrainer that controls at least one of the power source and the continuously variable transmission so as to restrain the front-rear vibration of the vehicle;

a vibration period calculator that calculates a specific vibration period of the vehicle in accordance with a state of load on the vehicle; and a timing determiner that determines a timing of a control output to the at least one of the power source and the continuously variable transmission based on the specific vibration period calculated by the vibration period calculator.

2. A vehicle vibration restraining apparatus according to claim 1, wherein the vibration period calculator is configured to calculate the specific vibration period of the vehicle based on a duration between peaks of change in an output rotation speed of the power source.

3. A vehicle vibration restraining apparatus according to claim 1, wherein the vibration period calculator is configured to calculate the specific vibration period of the vehicle based on a duration between peaks of change in a speed of the vehicle.

4. A vehicle vibration restraining apparatus according to claim 1, wherein the vibration period calculator is configured to calculate the specific vibration period of the vehicle based on a duration between peaks of change in an acceleration of the vehicle.

5. A vehicle vibration restraining apparatus according to claim 1, wherein the vibration period calculator is configured to calculate the specific vibration period of the vehicle by subjecting an output rotation speed of the power source to a fast Fourier transform.

6. A vehicle vibration restraining apparatus according to claim 1, wherein the vibration period calculator is configured to calculate the specific vibration period of the vehicle by subjecting a speed of the vehicle to a fast Fourier transform.

7. A vehicle vibration restraining apparatus according to claim 1, wherein the vibration period calculator is configured to calculate the specific vibration period of the vehicle by subjecting an acceleration of the vehicle to a fast Fourier transform.

8. A vehicle vibration restraining apparatus according to claim 1, wherein the vibration period calculator is configured to calculate the specific vibration period of the vehicle based on both the drive force from the power source and an acceleration of the vehicle.

9. A vehicle vibration restraining apparatus according to claim 1, further comprising a load detector that detects an amount of load carried by the vehicle, wherein the vibration period calculator is configured to calculate the specific vibration period of the vehicle based on the amount of load on the vehicle detected by the load detector.

10. A vehicle vibration restraining apparatus according to claim 1, further comprising a displacement detector that detects an amount of displacement of a vehicle height, wherein the vibration period calculator is configured to calculate the specific vibration period of the vehicle based on the amount of displacement of the vehicle height detected by the displacement detector.

11. A vehicle vibration restraining method for restraining a front-rear vibration of a vehicle having a power source that produces a drive force of the vehicle, and a continuously variable transmission that transmits the drive force to a vehicle-driving portion and that continuously varies a speed change ratio comprising:

calculating a specific vibration period in accordance with a state of load on the vehicle;

determining a timing of a control output to at least one of the power source and the continuously variable transmission based on the specific vibration period; and controlling the at least one of the power source and the continuously variable transmission at the determined timing so as to restrain the front-rear vibration of the vehicle.

12. A vehicle vibration restraining method according to claim 11, wherein the step of calculating the specific vibration period of the vehicle is performed based on a duration between peaks of change in an output rotation speed of the power source.

13. A vehicle vibration restraining method according to claim 11, wherein the step of calculating the specific vibration period of the vehicle is performed based on a duration between peaks of a duration between peaks of change in a speed of the vehicle.

14. A vehicle vibration restraining method according to claim 11, wherein the step of calculating the specific vibration period of the vehicle is performed based on a duration between peaks of change in an acceleration of the vehicle.

15. A vehicle vibration restraining method according to claim 11, wherein the step of calculating the specific vibration period of the vehicle is performed by subjecting an output rotation speed of the power source to a fast Fourier transform.

16. A vehicle vibration restraining method according to claim 11, wherein the step of calculating the specific vibration period of the vehicle is performed by subjecting a speed of the vehicle to a fast Fourier transform.

17. A vehicle vibration restraining method according to claim 11, wherein the step of calculating the specific vibration period of the vehicle is performed by subjecting an acceleration of the vehicle to a fast Fourier transform.

18. A vehicle vibration restraining method according to claim 11, wherein the step of calculating the specific vibration period of the vehicle is performed based on both the drive force from the power source and an acceleration of the vehicle.

19. A vehicle vibration restraining method according to claim 11, further comprising a step of detecting an amount of load carried by the vehicle, wherein the step of calculating the specific vibration period of the vehicle is performed based on the amount of load detected.

20. A vehicle vibration restraining method according to claim 11, further comprising the step of detecting an amount of displacement of a vehicle height, wherein the step of calculating the specific vibration period of the vehicle is performed based on the amount of displacement of the vehicle height detected.

21. A vehicle vibration restraining apparatus for restraining a front-rear vibration of a vehicle comprising a power source that produces a drive force of the vehicle and a continuously variable transmission that transmits the drive force to a vehicle-driving portion and that continuously varies a speed change ratio, the vehicle vibration restraining apparatus comprising:

vibration restrain means for controlling at least one of the power source and the continuously variable transmission so as to restrain the front-rear vibration of the vehicle;

vibration period calculator means for calculating a specific vibration period of the vehicle in accordance with a state of load on the vehicle; and timing determining means for determining a timing of a control output to the at least one of the power source and the continuously variable transmission based on the specific vibration period calculated by the vibration period calculator means.

22. A vehicle vibration restraining apparatus according to claim 21, wherein the vibration period calculator means calculates the specific vibration period of the vehicle based on a duration between peaks of change in an output rotation speed of the power source.

23. A vehicle vibration restraining apparatus according to claim 21, wherein the vibration period calculator means calculates the specific vibration period of the vehicle based on a duration between peaks of change in a speed of the vehicle.

24. A vehicle vibration restraining apparatus according to claim 21, wherein the vibration period calculator means calculates the specific vibration period of the vehicle based on a duration between peaks of change in an acceleration of the vehicle.

25. A vehicle vibration restraining apparatus according to claim 21, wherein the vibration period calculator means calculates the specific vibration period of the vehicle by subjecting an output rotation speed of the power source to a fast Fourier transform.

26. A vehicle vibration restraining apparatus according to claim 21, wherein the vibration period calculator means calculates the specific vibration period of the vehicle by subjecting a speed of the vehicle to a fast Fourier transform.

27. A vehicle vibration restraining apparatus according to claim 21, wherein the vibration period calculator means calculates the specific vibration period of the vehicle by subjecting an acceleration of the vehicle to a fast Fourier transform.

28. A vehicle vibration restraining apparatus according to claim 21, wherein the vibration period calculator means calculates the specific vibration period of the vehicle based on both the drive force from the power source and an acceleration of the vehicle.

29. A vehicle vibration restraining apparatus according to claim 21, further comprising load detector means for detecting an amount of load carried by the vehicle, wherein the vibration period calculator means calculates the specific vibration period of the vehicle based on the amount of load on the vehicle detected by the load detector means.

30. A vehicle vibration restraining apparatus according to claim 21, further comprising displacement detector means for detecting an amount of displacement of a vehicle height, wherein the vibration period calculator means calculates the specific vibration period of the vehicle based on the amount of displacement of the vehicle height detected by the displacement detector means.

* * * * *